(12) United States Patent
Ando et al.

(10) Patent No.: US 9,718,714 B2
(45) Date of Patent: Aug. 1, 2017

(54) SEPARATION MEMBRANE MODULE

(71) Applicant: TORAY INDUSTRIES, INC., Tokyo (JP)

(72) Inventors: Hideaki Ando, Otsu (JP); Yoshifumi Odaka, Otsu (JP); Yasuharu Watanabe, Otsu (JP)

(73) Assignee: Toray Industries, Inc., Tokyo (JP)

( * ) Notice: Subject to any disclaimer, the term of this patent is extended or adjusted under 35 U.S.C. 154(b) by 51 days.

(21) Appl. No.: 14/647,253

(22) PCT Filed: Nov. 14, 2013

(86) PCT No.: PCT/JP2013/080763
§ 371 (c)(1),
(2) Date: May 26, 2015

(87) PCT Pub. No.: WO2014/084057
PCT Pub. Date: Jun. 5, 2014

(65) Prior Publication Data
US 2015/0344337 A1 Dec. 3, 2015

(30) Foreign Application Priority Data

Nov. 27, 2012 (JP) ................................ 2012-258485
Nov. 27, 2012 (JP) ................................ 2012-258486
Mar. 28, 2013 (JP) ................................ 2013-068386

(51) Int. Cl.
*C02F 3/12* (2006.01)
*B01D 65/08* (2006.01)
(Continued)

(52) U.S. Cl.
CPC ............ *C02F 3/1273* (2013.01); *B01D 61/18* (2013.01); *B01D 63/00* (2013.01); *B01D 63/08* (2013.01);
(Continued)

(58) Field of Classification Search
CPC ...... B01D 63/08; B01D 63/082; B01D 65/00; B01D 65/02; B01D 2313/06;
(Continued)

(56) References Cited

U.S. PATENT DOCUMENTS 7,892,430 B2    2/2011  Voigt
2010/0000935 A1  1/2010  Sakai
(Continued)

FOREIGN PATENT DOCUMENTS

JP    08155277    6/1996
JP    09075965    3/1997
(Continued)

OTHER PUBLICATIONS

International Search Report for International Application No. PCT/JP2013/080763 mailed Dec. 10, 2013.

*Primary Examiner* — Katherine Zalasky
*Assistant Examiner* — Benjamin LeBron
(74) *Attorney, Agent, or Firm* — RatnerPrestia

(57) ABSTRACT

A separation-membrane module 1 includes an element block 2 that is formed by arranging, in parallel, a plurality of separation-membrane elements 4 that are formed by arranging a pair of separation-membranes with their respective permeate surfaces in opposition to each other and sealing the edges of the pair of the membranes; and an aeration block 3 that includes an aeration pipe 31 and that is disposed under the element block 2. In the element block 2, at least one upper spacer 8 is disposed in the upper portion of each space between the adjacent separation-membrane elements 4, and a lower spacer 9 is disposed under the upper spacer 8 in each space between the adjacent separation-membrane elements 4. And the leftmost and the rightmost separation-membrane elements 4 of the plurality of the separation-membrane elements 4 are secured to a frame 12 at the lower spacers 9.

3 Claims, 16 Drawing Sheets

(51) Int. Cl.
*B01D 63/00* (2006.01)
*C02F 1/44* (2006.01)
*B01D 63/08* (2006.01)
*B01D 65/00* (2006.01)
*C02F 3/20* (2006.01)
*B01D 61/18* (2006.01)
*B01D 65/02* (2006.01)
*B01D 71/30* (2006.01)
*B01D 71/32* (2006.01)
*B01D 71/34* (2006.01)
*B01D 71/62* (2006.01)
*B01D 71/68* (2006.01)

(52) U.S. Cl.
CPC ........... *B01D 63/082* (2013.01); *B01D 65/00* (2013.01); *B01D 65/02* (2013.01); *B01D 65/08* (2013.01); *C02F 1/444* (2013.01); *C02F 3/201* (2013.01); *B01D 63/081* (2013.01); *B01D 71/30* (2013.01); *B01D 71/32* (2013.01); *B01D 71/34* (2013.01); *B01D 71/62* (2013.01); *B01D 71/68* (2013.01); *B01D 2313/025* (2013.01); *B01D 2313/06* (2013.01); *B01D 2313/14* (2013.01); *B01D 2315/06* (2013.01); *B01D 2319/04* (2013.01); *B01D 2321/18* (2013.01); *B01D 2321/185* (2013.01); *Y02W 10/15* (2015.05)

(58) Field of Classification Search
CPC ............ B01D 2315/06; B01D 2319/04; B01D 2321/185; B01D 63/081; B01D 63/00; B01D 65/08; B01D 2313/025; B01D 2313/14; B01D 2321/18; B01D 61/18; B01D 71/30; B01D 71/32; B01D 71/34; B01D 71/62; B01D 71/68; C02F 3/1273; C02F 3/201; C02F 1/444
See application file for complete search history.

(56) References Cited

U.S. PATENT DOCUMENTS

2010/0096317 A1* 4/2010 Morita ................ B01D 63/082
210/321.84
2011/0000840 A1* 1/2011 Kiene ................ B01D 63/082
210/249

FOREIGN PATENT DOCUMENTS

| JP | 09201517 | 8/1997 |
| JP | 11244672 | 9/1999 |
| WO | 2006045440 | 5/2006 |
| WO | 2007122839 | 11/2007 |
| WO | 2008117783 | 10/2008 |

* cited by examiner

SEPARATION MEMBRANE MODULE

CROSS REFERENCE TO RELATED APPLICATIONS

This is the U.S. National Phase application of PCT/JP2013/080763, filed Nov. 14, 2013, which claims priority to Japanese Patent Application Nos. 2012-258485, filed Nov. 27, 2012, 2012-258486, filed Nov. 27, 2012, and 2013-068386, filed Mar. 28, 2013, the disclosures of each of these applications being incorporated herein by reference in their entireties for all purposes.

FIELD OF THE INVENTION

The present invention relates to a separation-membrane module that is suitable in the field of water treatment such as production of potable water, water purification, and wastewater treatment and in the food field.

BACKGROUND OF THE INVENTION

In recent years, flat-sheet and hollow-fiber separation-membranes have come into use in the field of water treatment and the food field. For example, separation-membrane elements that include a separation membrane, and separation-membrane modules that include a plurality of such separation-membrane elements are used in water purification apparatuses. Separation membranes used in a separation process that uses separation-membrane elements are classified into microfiltration membranes, ultrafiltration membranes, nanofiltration membranes, reverse osmosis membranes, forward osmosis membranes, and the like, in terms of their pore diameter and separation function. These membranes are used, for example, to obtain potable water from, for example, seawater, brine water, and water that contains a deleterious substance, to produce ultrapure water for industrial use, to treat wastewater, and to recover a valuable material. A membrane to be used is selected based on a substance to be separated and the ability of the membrane to separate substances.

Separation-membrane activated-sludge systems (membrane bioreactors: MBR) include separation membranes that are submerged in an activated sludge tank to separate the activated sludge and the treated water. MBR occupy a smaller space and achieve a good water quality. Thus, in Japan, MBR are being adopted mainly by small facilities, while, in other countries that have a number of new facilities, MBR are being adopted by large facilities that treat water of more than 100,000 m$^3$ per day.

The activated-sludge process involves air introduced into the treatment tank to cultivate aerobic microorganisms in the tank. Fixation of an aeration block that includes an aerator under a membrane unit (hereinafter referred to as "element block") allows a mixed stream of gas and liquid, the stream formed by aeration, to ascend through the element block to scour membrane surface fouling. Thus, the membrane unit can separate solid and liquid while cleaning membrane surfaces, which can provide for low-cost membrane-filtration. In this case, a combination of the element block and the aeration block is typically referred to as a separation-membrane module.

Conventionally, a flat-sheet separation-membrane element is formed by securing the periphery of a membrane (semipermeable membrane) by heat sealing or the like to both the front and the back sides of a strong, porous, flat support plate. And an element block is formed by arranging a plurality of such separation-membrane elements in parallel and inserting the arranged membrane-elements into a cuboid module-housing that has grooves therein and an opening at the top and the bottom.

Pocket separation-membrane elements without a support plate have been also proposed. Some of such elements are formed by sealing the perimeter of a separation membrane and creating a hole into which a permeate discharge pipe is fit. In a manner similar to the manner described above, a separation-membrane module is formed by arranging a plurality of such elements and communicating the elements with a discharge pipe (see, for example, Patent Documents 1 and 2).

Because the pocket separation-membrane elements without a support plate have a light weight and flexibility, the separation membranes flutter when the membranes are subject to a flow of water-to-be-treated (raw liquid), which discourages sludge attachment. However, when the separation membranes receive a large amount of water-to-be-treated, the membranes flutter intensely. Then, the membrane surfaces come into contact with each other especially at the upper end of the separation-membrane element, which causes serious problems that impair the separation function of the membranes, the problems including rupture and detachment of the separation membranes and the sealing portions.

To reduce flutter of a pocket separation-membrane element without a support plate, a method of securing the four corners of the element has been proposed. Such pocket separation-membrane has flexibility, but the four corners do not change their position. Thus, the membrane is blown up by the upward flow generated by aeration, and the upper portion vibrates more intensely, which causes the problem that adjacent membranes come into contact with each other and then the membranes are damaged (see Patent Document 3).

A method of applying tension to the four corners has been proposed to prevent slack. However, the constant application of the force stretches the membranes over time, and the tension force of the springs is reduced (see Patent Documents 3).

PATENT DOCUMENTS

Patent Document 1: Japanese Unexamined Patent Application Publication No. H8-155277
Patent Document 2: Japanese Unexamined Patent Application Publication No. H11-244672
Patent Document 3: WO 2006-045440

SUMMARY OF THE INVENTION

It is an object of the present invention to provide a high-efficiency separation-membrane module that overcomes the above problems, that includes separation membranes that flutter without damaging the membranes even if a pocket separation-membrane element without a support plate is used, and that discourages sludge attachment.

To solve the problems described above, the present invention includes the following aspects (1)-(4):

(1) A separation-membrane module including an element block that is formed by arranging, in parallel, a plurality of separation-membrane elements that are formed by arranging a pair of separation-membranes with their respective permeate surfaces in opposition to each other and sealing the edges of the pair of the membranes; and an aeration block that includes an aeration pipe and that is disposed under the element block, wherein in the element block, at least one upper spacer is disposed in the upper portion of each space between the adjacent separation-membrane elements, and a lower spacer is disposed under the upper spacer in each space between the adjacent separation-membrane elements, and wherein the leftmost and the rightmost separation-membrane elements of the plurality of the separation-membrane elements are secured to a frame at the respective lower spacers.

(2) The separation-membrane module according to (1), wherein each of the upper spacers, each of the lower spacers, and each of the separation-membrane elements have a through hole, wherein in the element block, the separation-membrane elements and the upper spacers, and the separation-membrane elements and the lower spacers are connected together by passing a shaft through the through holes.

(3) The separation-membrane module according to (1) or (2), wherein the frame includes a guide that limits horizontal movement of a portion of the leftmost and the rightmost separation-membrane elements of the plurality of the separation-membrane elements, the portion abutting the upper spacers.

(4) The separation-membrane module according to any one of (1)-(3), wherein the frame includes a receiver that limits downward movement of a portion of the leftmost and the rightmost separation-membrane elements of the plurality of the separation-membrane elements, the portion abutting the upper spacers.

In the separation-membrane module according to an embodiment of the present invention, the separation-membrane elements are secured to the frame only at the respective lower spacers, and thus the upper portion of the membranes is freely movable even when the membranes are blown up by aeration, which can prevent slack in the membranes and can prevent contact between the membranes, while the upper spacers and the lower spacers allow maintenance of spacing between separation membranes. Thus, the present invention can provide a high-efficiency separation-membrane module that includes separation membranes that flutters without damaging the membranes and that discourages sludge attachment.

DETAILED DESCRIPTION OF EMBODIMENTS OF THE INVENTION

Figure 1:
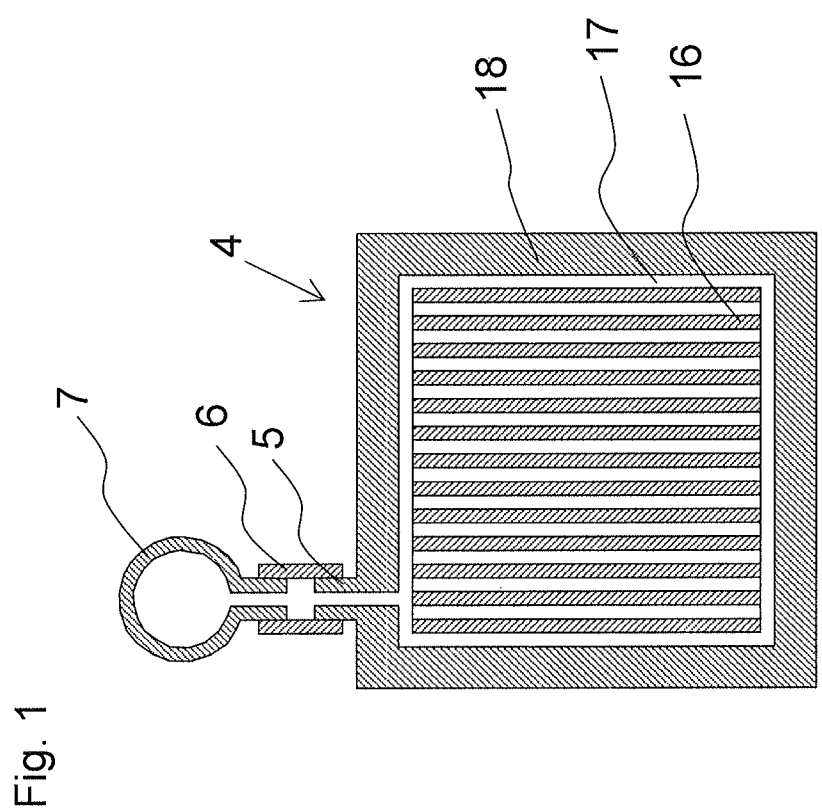
FIG. 1 is a cross-sectional view schematically illustrating a separation-membrane element that constitutes a separation-membrane module according to an embodiment of the present invention.

Now, embodiments of the present invention will be described with reference to the drawings, although the present invention is not limited to the embodiments illustrated in the drawings.

FIG. 1 is a cross-sectional view taken along the longitudinal center plane of a separation-membrane element that constitutes a separation-membrane module according to an embodiment of the present invention. In addition to the separation-membrane element 4, a collection pipe 7 and a tube 6 are illustrated.

In FIG. 1, the separation-membrane element 4 mainly includes a pair of flat-sheet separation-membranes 17 that are arranged with their respective permeate surfaces in opposition to each other. The pair of separation membranes includes sealed edges 18 to form a pocket structure. The separation-membrane element 4 includes, on the permeate surface of the separation membranes 17 and inboard of the sealed edges 18, collection path members 16 through which the filtered-water flows.

In the embodiment, the separation membranes that constitute "the pair of separation membranes" may be two separable separation membranes or a single separation membrane folded onto itself. And a space is formed between the opposing permeate-surfaces of the separation membranes.

Figure 2:
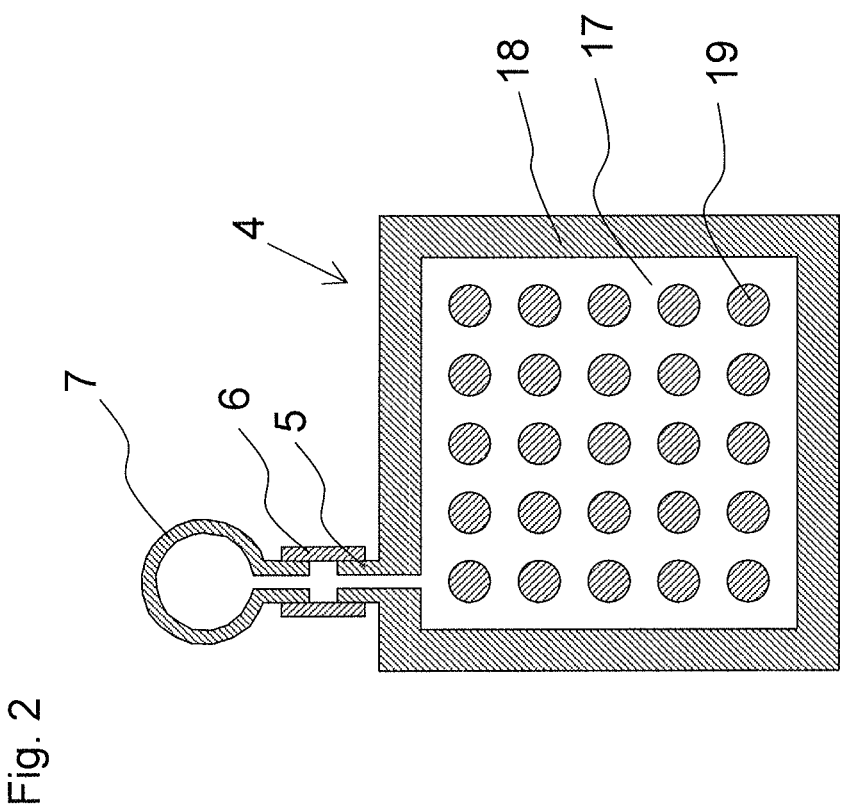
FIG. 2 is a cross-sectional view schematically illustrating a separation-membrane element that constitutes a separation-membrane module according to another embodiment of the present invention.

The collection path members 16 may be water-permeable sheet-members such as, for example, nonwoven fabrics, woven fabrics, and nets. Preferably, the collection path members 16 are formed as resin members 19 bonded to both of the opposing permeate surfaces of the pair of separation membranes, as illustrated in FIG. 2. Preferably, the resin members 19 are organized in a dot, linear, or lattice cross-sectional arrangement. Part of the edges 18 has a collection unit. In the collection unit, a collection path communicates with the exterior to recover the filtered water.

The collection unit of the separation-membrane element 4 includes a suction tube 5 for drawing the filtered water. The suction tube 5 is connected to the collection pipe 7 via a tube 6. A suction pump (not shown) is connected downstream of the collection pipe 7 to apply negative pressure to the interior of the separation-membrane element 4 for drawing the filtered water.

Figure 3:
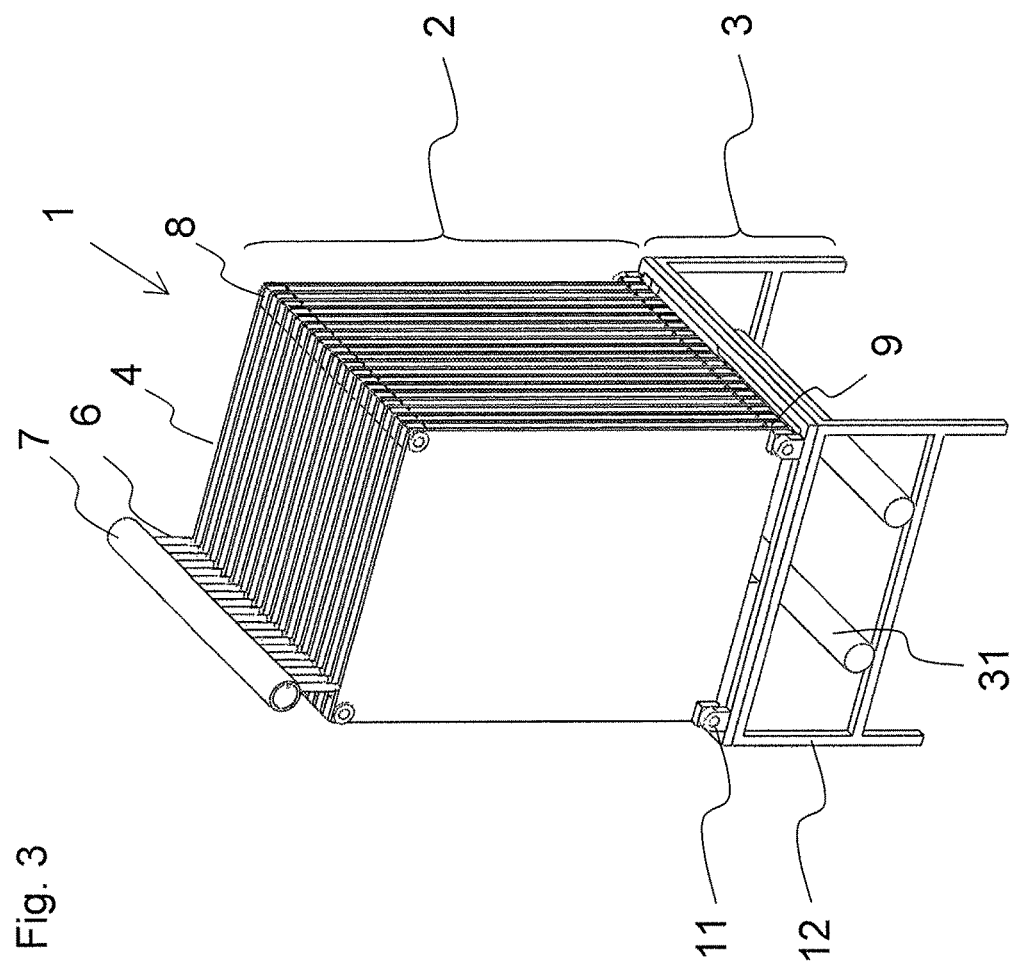
FIG. 3 is a perspective view schematically illustrating a separation-membrane module according to an embodiment of the present invention.

FIG. 3 is a perspective view illustrating a separation-membrane module according to an embodiment of the present invention.

In FIG. 3, the separation-membrane module 1 includes an element block 2, an aeration block 3, and a collection pipe 7. The element block 2 includes a plurality of separation-membrane elements 4 that are arranged in parallel within a housing frame 12. An aeration block 3 that includes an aeration pipe 31 is disposed under the element block 2. The aeration pipe 31 of the aeration block 3 is connected to a blower (not shown). Air is blown from the underlying aeration block 3 toward the element block 2 of the separation-membrane module 1, the module being submerged in water-to-be-treated in a submerged membrane tank.

Figure 4:
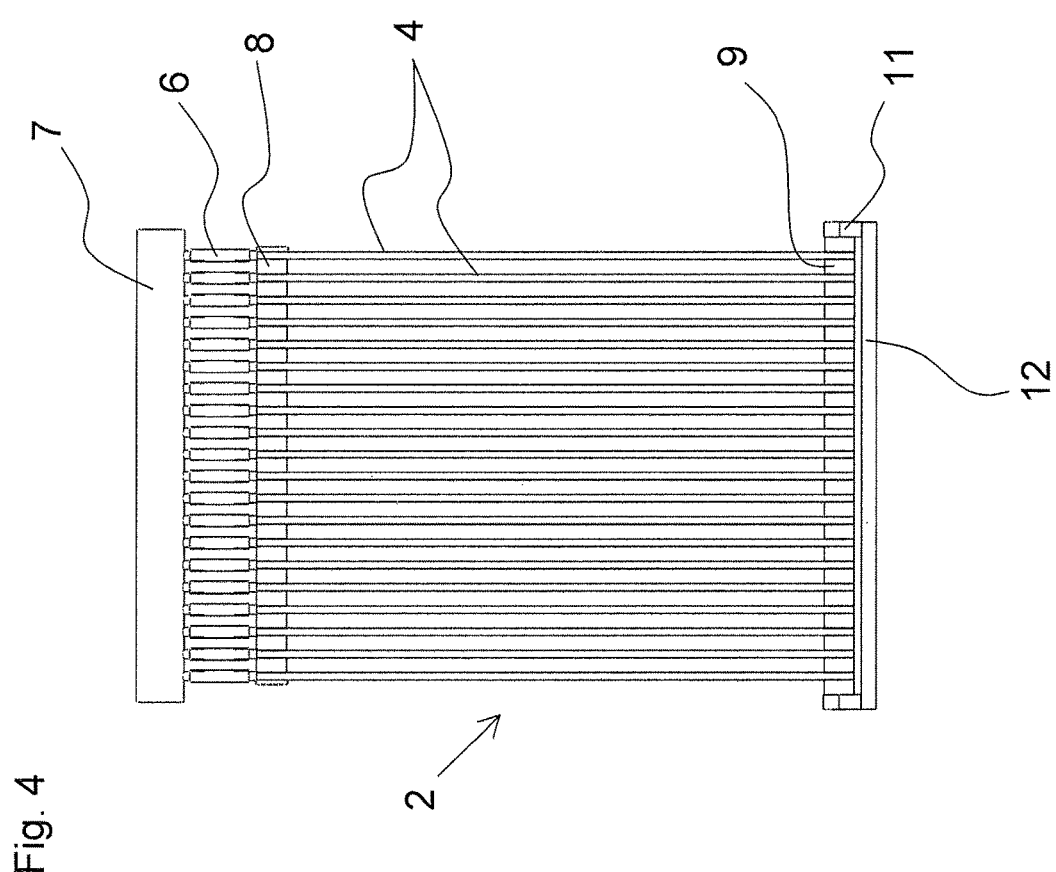
FIG. 4 is a side view schematically illustrating an element block that constitutes a separation-membrane module according to an embodiment of the present invention.

FIG. 4 is a side view illustrating an element block 2 that constitutes a separation-membrane module according to an embodiment of the present invention. In the element block 2, at least one upper spacer 8 is disposed in the upper portion of each space between adjacent separation-membrane elements 4, or both side of the separation-membrane elements 4 in a direction horizontal to the separation-membrane elements 4. A lower spacer 9 is disposed under the upper spacer 8 in each space between adjacent separation-membrane elements 4. The leftmost and the rightmost separation-membrane elements 4 of a plurality of the separation-membrane elements 4 that are arranged in parallel are secured to a housing frame 12 at the respective lower spacers 9. While the leftmost and the rightmost separation-membrane elements 4 may be directly secured to the housing frame 12, the leftmost and the rightmost separation-membrane elements 4 are preferably secured via the lower spacer 9 to the housing frame 12 with a fastener 11. Because the separation-membrane elements 4 are secured to the housing frame 12 only at the respective lower spacers 9, and the separation-membrane elements 4 are not secured to the housing frame 12 at the respective upper spacers 8, the upper portion of the membranes is freely movable even when the membranes are blown up by the upward flow generated by aeration, which can prevent slack in the upper portion of the membranes and can avoid damage to the membranes due to contact between the membranes.

Figure 5:
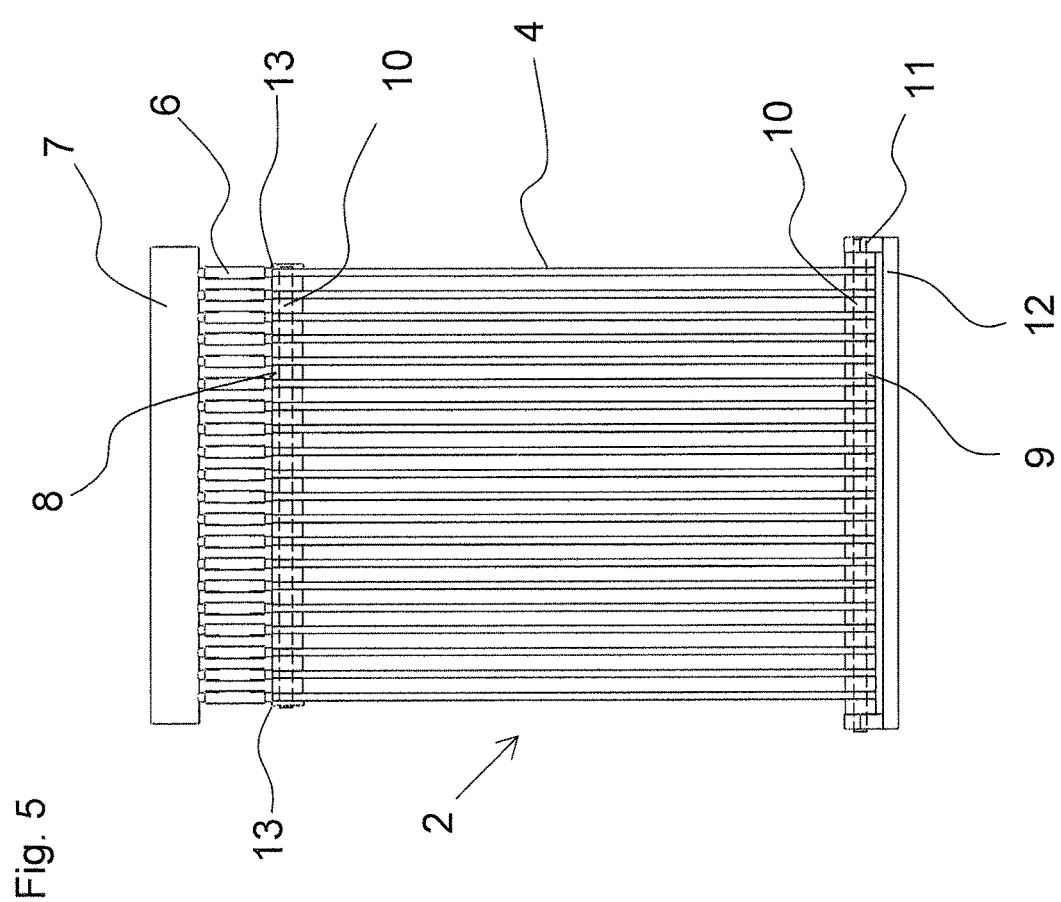
FIG. 5 is a side view schematically illustrating an element block that constitutes a separation-membrane module according to another embodiment of the present invention.

FIG. 5 is a side view schematically illustrating an element block 2 that constitutes a separation-membrane module according to another embodiment of the present invention. Preferably, each of separation-membrane elements 4 are in close contact with an upper spacer 8 and a lower spacer 9. Preferably, as illustrated in FIG. 5, the separation-membrane elements 4 includes a through hole at the upper spacer 8 and at the lower spacer 9, and the upper spacer 8 and the lower spacer 9 include a through hole. And preferably, a shaft 10 is passed through each of the through holes to connect the elements and the spacers together. Preferably, the both ends of the shaft 10 that is passed through the lower spacers 9 are secured to a housing frame 12 with a fastener 11. Preferably, the leftmost and the rightmost separation-membrane elements 4 are secured with a fastener 13 near the both ends of the shaft 10 that is passed through the lower spacers 8.

Figure 6:
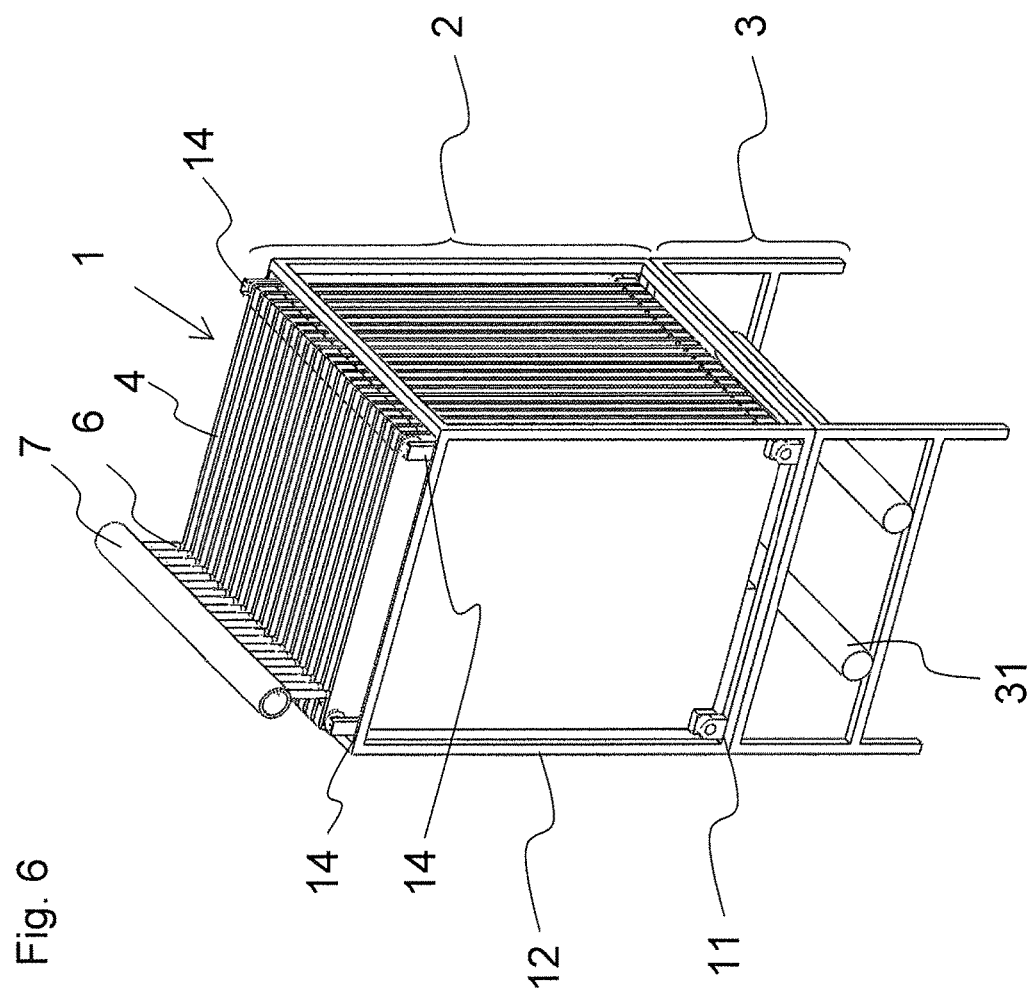
FIG. 6 is a perspective view schematically illustrating a separation-membrane module according to another embodiment of the present invention.

FIG. 6 is a perspective view schematically illustrating a separation-membrane module according to another embodiment of the present invention. A housing frame 12 can include a guide 14 that limits horizontal movement of a portion of the leftmost and the rightmost separation-membrane elements 4 of the separation-membrane elements 4 that are arranged in parallel, the portion abutting the upper spacers.

Figure 7:
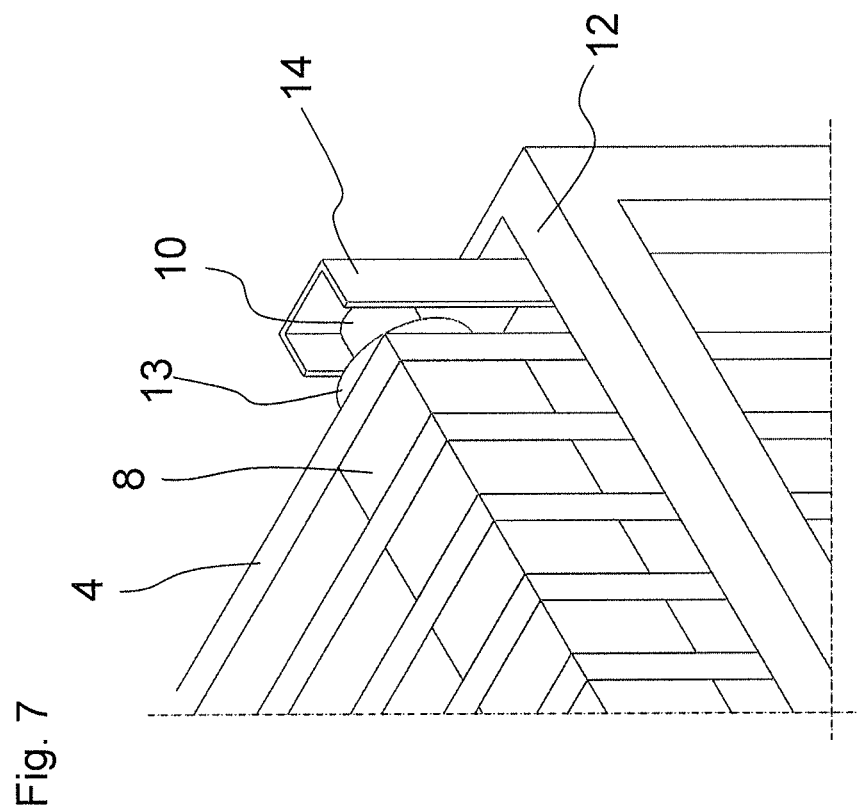
FIG. 7 is a partially enlarged schematic perspective view illustrating a guide that constitutes a separation-membrane module according to an embodiment of the present invention.

FIG. 7 is an enlarged schematic perspective view illustrating a portion of the guide 14. The guide 14 that limits horizontal movement of the separation-membrane elements 4 that are connected together at the upper spacers may be attached to the housing frame 12. The guide 14 illustrated in FIG. 7 is a channel that has a U-shaped cross-section. Such configuration allows reduction of horizontal vibration of the overall separation-membrane elements 4, which can reduce load to the lower fastener 11, prevent damage, and simplify the structure of the lower fastener. The separation-membrane element 4 and the guide 14 may be connected via a low modulus member. This can prevent the frictional wear between the separation-membrane element 4 and the guide. While the guide 14 limits horizontal movement of a portion of the separation-membrane elements, the portion abutting the upper spacers 8, the guide 14 does not limit vertical movement of the separation-membrane elements. The guide 14 is not limited to the configuration illustrated in FIG. 7 as long as the above requirements are met.

In a separation-membrane module according to the present invention, the frame 12 can include a receiver 15 that limits downward movement of the leftmost and the rightmost separation-membrane elements 4 of the separation-membrane elements 4 that are arranged in parallel.

Figure 8:
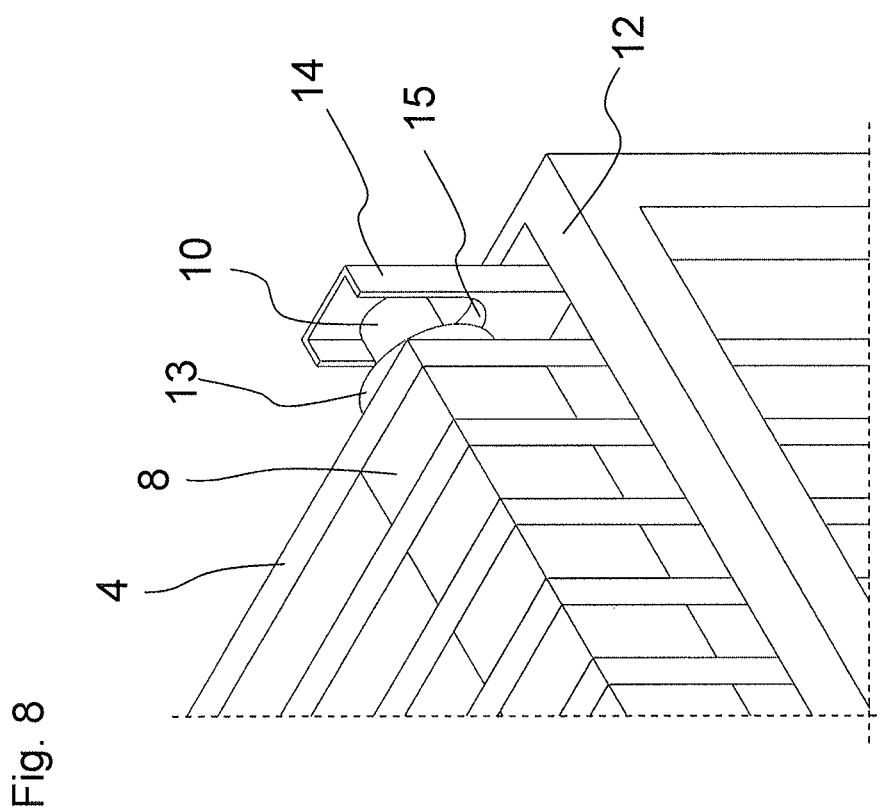
FIG. 8 is a partially enlarged schematic perspective view illustrating a receiver that constitutes a separation-membrane module according to an embodiment of the present invention.

FIG. 8 is an enlarged schematic perspective view illustrating a portion of the receiver 15. In a case in which the separation-membrane elements 4 have low rigidity, the frame may include a receiver 15 that limits downward movement of a portion of the overall separation-membrane elements 4, the portion abutting the upper spacers 8. In a case in which the separation-membrane module 1 is placed outside of the treatment tank, or in a case in which aeration is not provided in the treatment tank, and thus the water-to-be-treated does not flow upwardly, that is, in a case in which the separation-membrane elements 4 cannot stand under its own weight, limitation of downward movement of the overall separation-membrane elements 4 by the receiver 15 allows prevention of damage to the separation-membrane elements 4. In the embodiment illustrated in FIG. 8, the receiver 15 is integrally formed with the guide 14, while the receiver 15 may be formed separately from the guide 14.

The upper spacers 8 and the lower spacers 9 have a plate shape or an annular shape. For the spacers, any of plan view shapes can be selected, including, for example, circular, rectangular, elliptical, and rhomboid shapes. Regardless of their shapes, the upper and the lower spacers may include a through hole through which a shaft 10 is passed.

Desirably, at least a surface of the upper spacers 8 and the lower spacers 9, the surface abutting the adjacent separation-membrane elements, is made of a rubber material that has a durometer hardness (type A) of from 20 to 95, as determined according to ISO 7169-1 or a plastic material that has a Rockwell hardness (scale R) of from 50 to 130, as determined according to ISO 2039-1. More preferably, the upper spacers 8 and the lower spacers 9 are made of a material that has a durometer hardness (type A) of from 20 to 95.

Examples of the material that has a durometer hardness (type A) of from 20 to 95, as determined according to ISO 7169-1, include, for example, various rubber materials such as urethane rubbers, nitrile rubbers, chloroprene rubbers, ethylene rubbers, butyl rubbers, fluoro-rubbers, silicon rubbers, and low modulus rubbers that have such durometer hardness (type A). Examples of the plastic material that has a Rockwell hardness (scale R) of from 50 to 130, as determined according to ISO 2039-1, include, for example, general-purpose plastics such as polyethylene terephthalates, polypropylenes, polyethylenes, and polycarbonates, and general-purpose engineering plastics such as nylons, polyacetals, ABS, polyvinylidene fluorides, and tetrafluoroethylene resins.

The material of the housing frame 12 can be selected at will, including, for example, various metals such as stainless steels and aluminum, various thermoplastic resins such as PVC resins and ABS resins, and various thermosetting resins such as polyurethane resins and epoxy resins. Suitably, a highly corrosion-resistant and highly rigid stainless material is used.

The material of the shaft 10 can be selected at will, including, for example, various metals such as stainless steels and aluminum, various thermoplastic resins such as PVC resins and ABS resins, and various thermosetting resins such as polyurethane resins and epoxy resins. Suitably, a highly corrosion-resistant and highly rigid stainless material is used. A solid shaft or a hollow shaft may be used as long as the shaft can serve as a connector. The cross-sectional shape of the shaft is not limited to a circular shape, and the shaft may have any cross-sectional shape including, for example, elliptical and approximately rectangular shapes.

Figure 16:
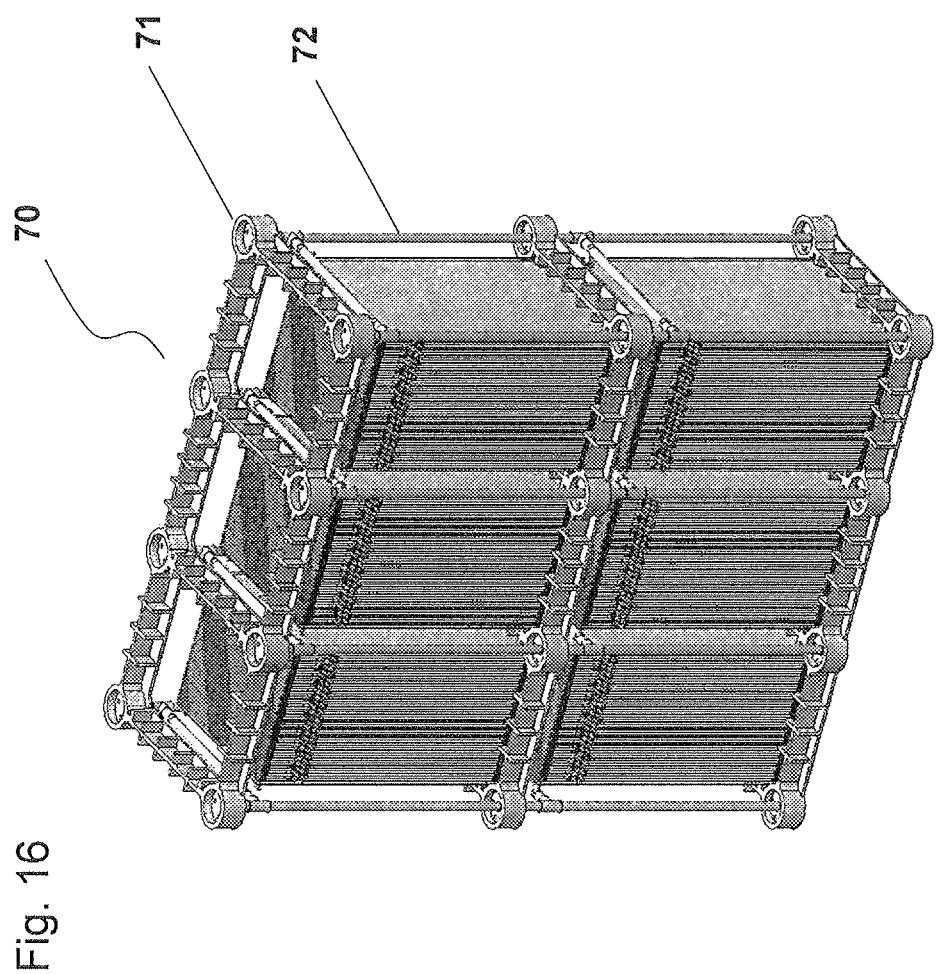
FIG. 16 is a perspective view schematically illustrating an element block that is formed by arranging, in a matrix, bundles of a plurality of separation-membrane elements that are arranged in parallel according to an embodiment of the present invention.

Preferably, the housing frame 12 is configured to arrange, in two or more columns, bundles of a plurality of the separation-membrane elements that are arranged in parallel. The housing frame may have any configuration as long as the desired features and the effects described above can be achieved. Like a multi-stacked module 70 illustrated in FIG. 16, element blocks may be formed by simply using a PVC base plate 71 and a stainless pipe unit 72.

A separation-membrane module according to a second preferred embodiment includes an element block that is formed by arranging, in parallel, a plurality of pairs of separation-membranes with their respective permeate surfaces in opposition to each other and sealing edges of the pairs of the membranes; an aeration block that includes an aeration pipe and that is disposed under the element block. In the element block, at least one upper spacer is disposed in the upper portion of each space between the adjacent separation-membrane elements, and a lower spacer is disposed under the upper spacer in each space between the adjacent separation-membrane elements. The total T1 of the thickness of each of the upper spacers, the thickness being perpendicular to the surface of the separation membranes, and the thickness of the upper portion of the separation-membrane element that abuts the upper spacer, and the total T2 of the thickness of each of the lower spacers, the thickness being perpendicular to the surface of the separation membranes, and the thickness of the lower portion of the separation-membrane element that abuts the lower spacer satisfy the formula $0<T1/T2<1$. Preferably, in a separation-membrane module according to the second embodiment, the leftmost and the rightmost separation-membrane elements of a plurality of the separation-membrane elements that are arranged in parallel are secured to a frame at the respective lower spacers, and the separation-membrane elements are not secured to the separation frame at the respective upper spacers.

Figure 9:
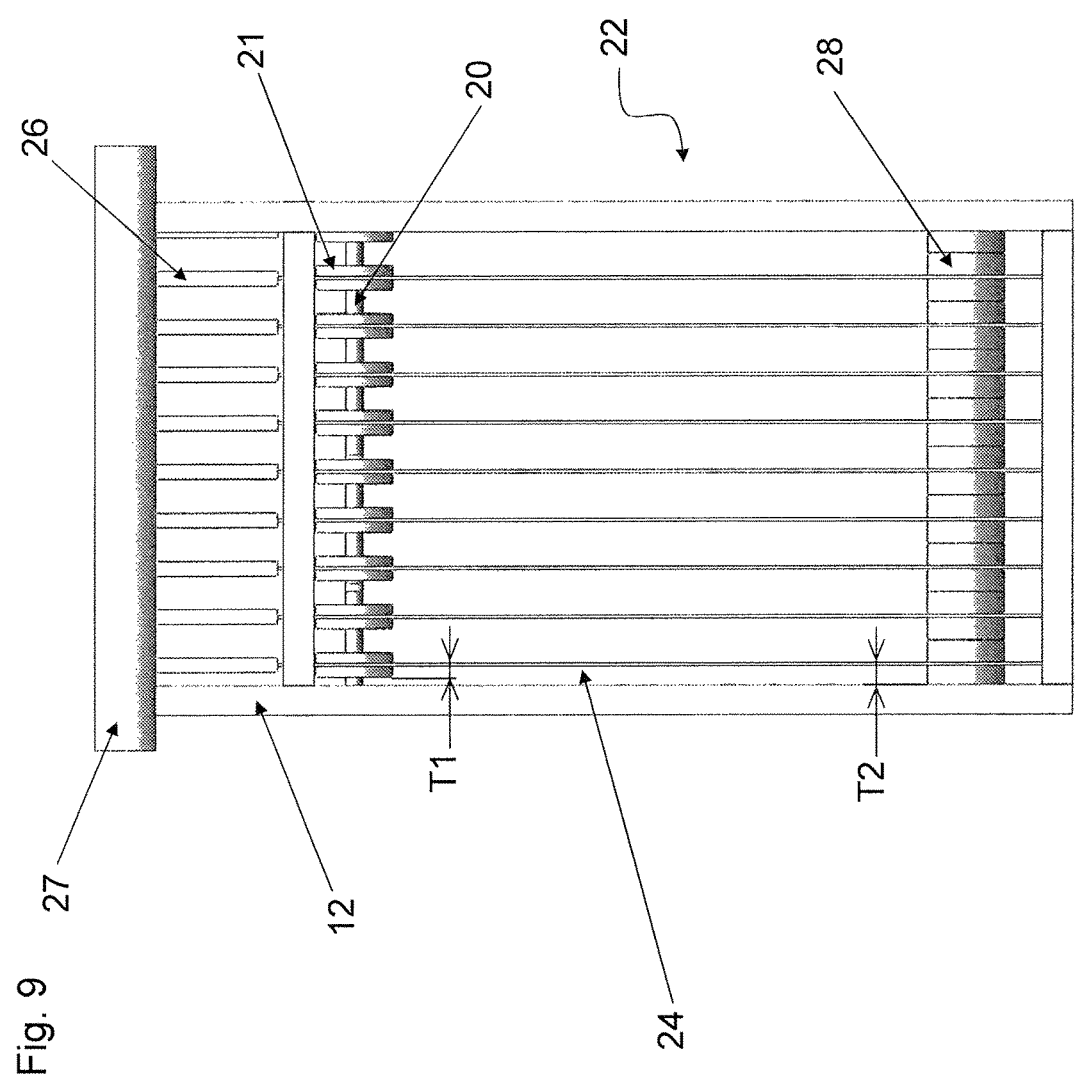
FIG. 9 is a side view schematically illustrating an element block that constitutes a separation-membrane module according to another embodiment of the present invention.

FIG. 9 is a side view illustrating an element block 22 that constitutes a separation-membrane module according to the second embodiment. The separation-membrane module, the element block, and the separation-membrane elements have a basic configuration as described above. In the element block 22, at least one upper spacer 21 is disposed in the upper portion of each space between the adjacent separation-membrane elements 24, in a direction horizontal to the separation-membrane elements 24. A lower spacer 28 is disposed under the upper spacer 21 in each space between the adjacent separation-membrane elements 24. In FIG. 9, each of the separation-membrane elements is sandwiched between the upper spacers 21 and between the lower spacers 28, and a shaft 20 is passed through the elements and the spacers. The total of the thickness of one of the upper spacers 21 and the thickness of one of the separation-membrane elements 24 in the axial direction of the shaft 20, that is, the total of the thickness of one of the upper spacers 21, the thickness being perpendicular to the surface of the separation membranes, and the thickness of the upper portion of the separation-membrane element 24 that abuts the upper spacer 21 is represented as T1. The total of the thickness of one of the lower spacers 28 and the thickness of one of the separation-membrane elements 24 in the axial direction of the shaft 20, that is, the total of the thickness of one of the lower spacers 28, the thickness being perpendicular to the surface of the separation membranes, and the thickness of the lower portion of the separation-membrane element 24 that abuts the lower spacer 28 is represented as T2.

In the present invention, the total T1 of the thickness of each of the upper spacers 21 and the thickness of the upper portion of the separation-membrane element 24 that abuts the upper spacer 21, and the total T2 of the thickness of each of the lower spacers 28 and the thickness of the lower portion of the separation-membrane element 24 that abuts the lower spacer 28 preferably satisfy the equation $0<T1/T2<1$. In other words, the total of the thickness of each of the upper spacers 21 and the thickness of the upper portion of the separation-membrane element 24 that abuts the upper spacer 21 is smaller than the total of the thickness of each of the lower spacers 28 and the thickness of the lower portion of the separation-membrane element 24 that abuts the lower spacer 28. The satisfaction of the equation $T1/T2<1$ allows the separation-membrane elements 24 to flutter intensely when the elements are subject to a flow of water-to-be-treated, which can improve detachability of a turbid component that is attached to a surface of the membranes. The satisfaction of the equation $0<T1/T2$ allows a member that prevents contact of the separation-membrane elements 24 with each other to be provided at the upper portion of the separation-membrane elements 24. Thus, even if the separation-membrane elements 24 flutter intensely when the elements are subject to a flow of water-to-be-treated, the upper spacers 21 can prevent the separation-membrane elements 24 from coming into contact with each other.

The total T1 of the thickness of each of the upper spacers 21 and the thickness of the upper portion of the separation-membrane element 24 that abuts the upper spacer 21, and the total T2 of the thickness of each of the lower spacers 28 and the thickness of the lower portion of the separation-membrane element 24 that abuts the lower spacer 28 are not restricted as long as the total T1 and the total T2 satisfy the equation $0<T1/T2<1$. Preferably, the total T1 and the total T2 satisfy the equation $0.2 \leq T1/T2 \leq 0.8$. The satisfaction of the equation $T1/T2 \leq 0.8$ more efficiently allows the separation-membrane elements to flutter intensely when the elements are subject to a flow of water-to-be-treated. The satisfaction of the equation $0.2 \leq T1/T2$ more efficiently allows the upper spacers 21 to prevent contact of the separation-membrane elements 24 with each other even if the separation-membrane elements flutter intensely.

In a case in which the thickness of a portion of the separation-membrane elements 24, the portion abutting the upper spacers 21, differs from the thickness of a portion of the separation-membrane elements 24, the portion abutting the lower spacers 8, the thickness of the upper spacers 21 and/or the thickness of the lower spacers 28 may be set to satisfy the above equation. As used herein, the thickness of each of the separation-membrane elements 24 is selected from, for example, the thickness of the separation membrane itself, the total thickness of the separation membrane and a grommet for reinforcing the through hole 29, and the total thickness of the separation membrane, a plate member such as a fabric member, a resin member, and a rubber member (the member other than the upper spacers 21 and the lower spacers 28) that is attached to the separation membrane, and optionally a support plate itself (in a case in which the separation-membrane elements 24 include the support plate), as desired depending on the specification and the configuration of the separation-membrane elements 24.

Figure 10:
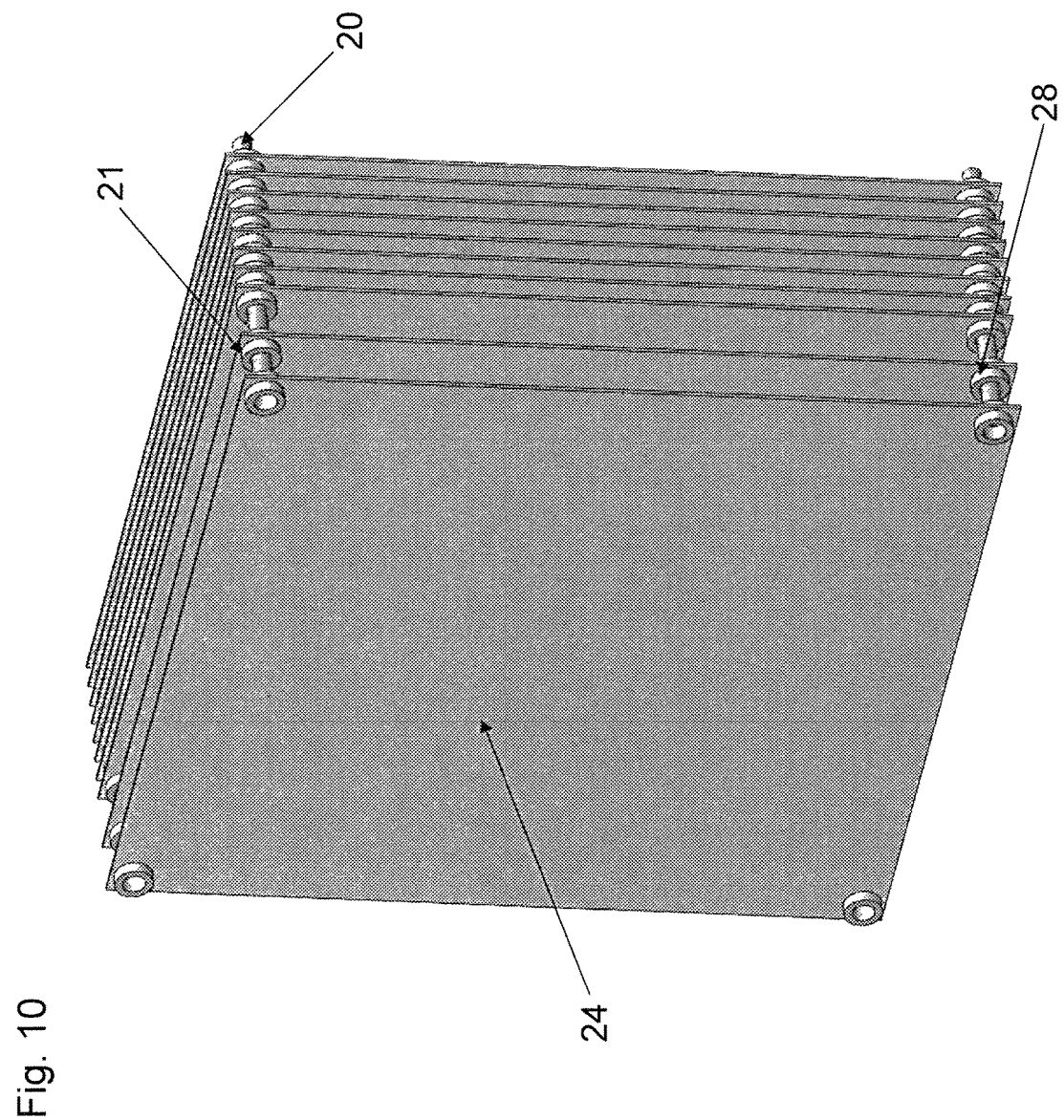
FIG. 10 is a perspective view schematically illustrating a separation-membrane module that constitute an element block that constitutes a separation-membrane module according to an embodiment of the present invention.
Figure 11:
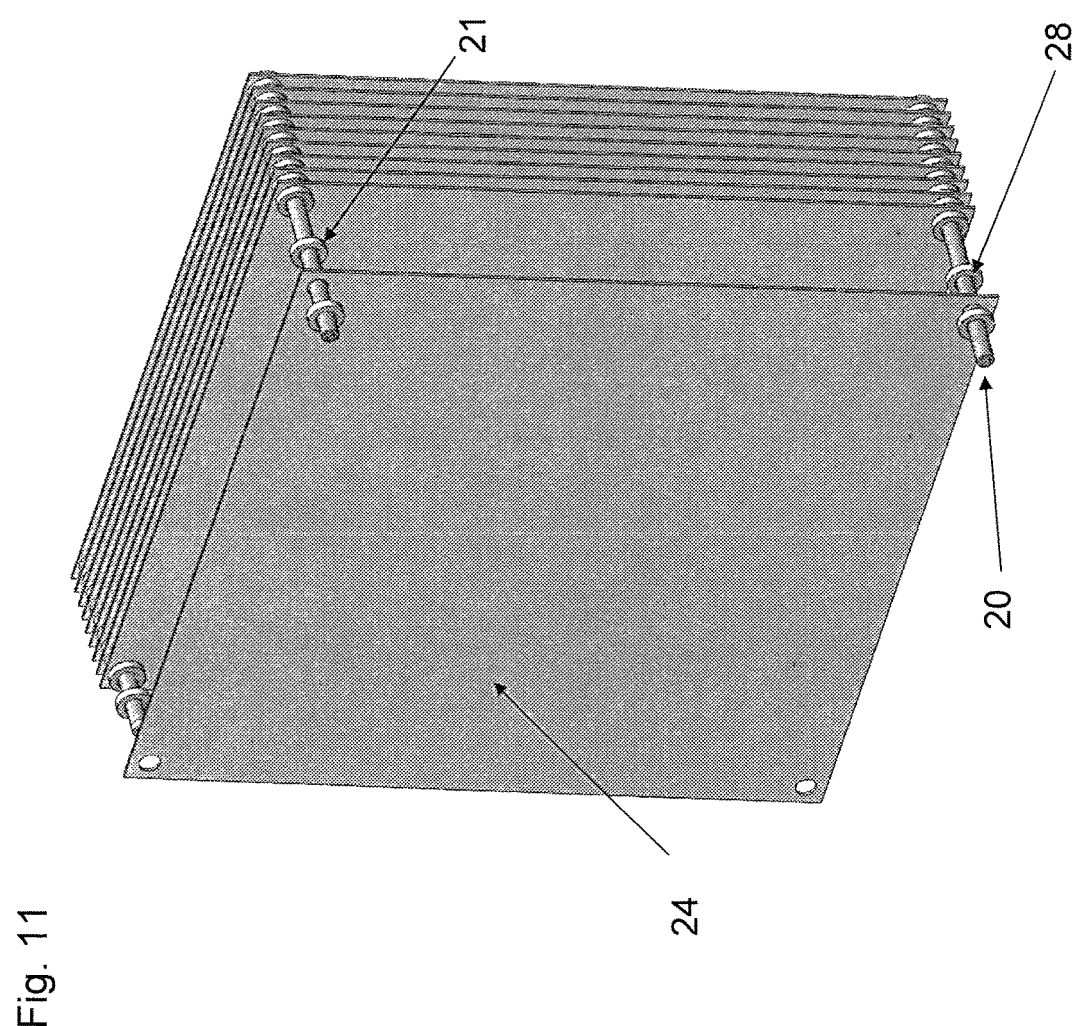
FIG. 11 is a perspective view schematically illustrating a separation-membrane module that constitute an element block that constitutes a separation-membrane module according to another embodiment of the present invention.

As illustrated in FIG. 10, the lower spacers 28 and the upper spacers 21 may be integrally fixed to a predetermined portion of the separation-membrane elements 24 to form a thick-walled portion. As illustrated in FIG. 11, the lower spacers 28 and the upper spacers 21 may be attached (as a separate structure) during assembly of the element block so that the separation-membrane elements 24 are sandwiched in the thickness direction between the spacers. In this case, any number of the lower spacers 28 and the upper spacers 21 may be disposed in each space between the adjacent separation-membrane elements 24 depending on the desired width of the raw-water flow path. Desirably, a single lower spacer and a single upper spacer are disposed in each space between the elements to decrease the number of members.

With regard to the separation structure, the lower spacers 28 may be separately disposed between the separation-membrane elements, or the lower spacers 28 may be connected to each other and then be attached to both sides of the separation-membrane elements.

The lower spacers 28 have a plate shape or an annular shape. And any of plan view shapes can be selected, including, for example, a circular shape as illustrated in FIGS. 10 and 11, a rectangular shape, an elliptical shape, and a rhomboid shape. Regardless of their shape, the lower spacers 28 may include a through hole through which a shaft 20 is passed.

Figure 12:
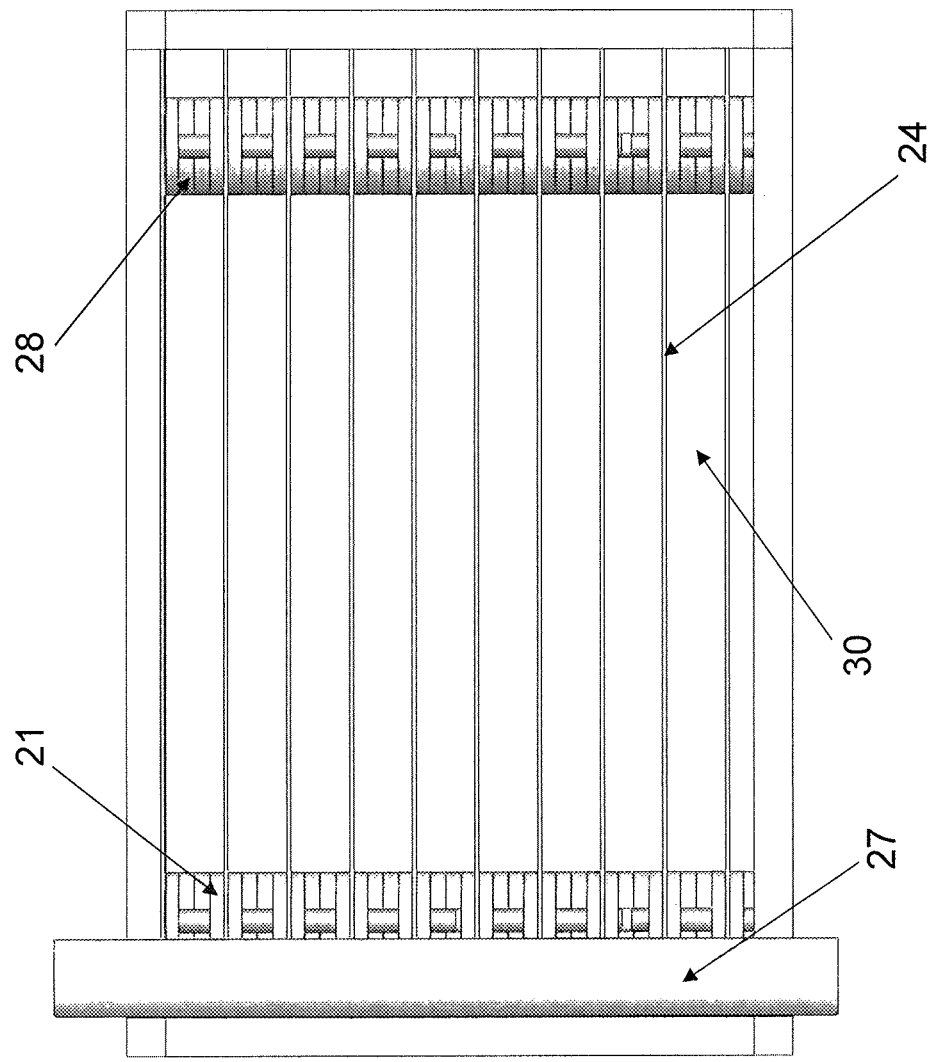
FIG. 12 is a plan view schematically illustrating an element block that constitutes a separation-membrane module according to another embodiment of the present invention.

As illustrated in FIG. 12, raw-water flow paths 30 through which the water-to-be-treated passes are formed in the spaces surrounded by the respective lower spacers 28 that are disposed on the left and the right surfaces of the separation-membrane elements 24 and the separation-membrane elements 24. Thus, the total T2 of the thickness of each of the lower spacers 28 and the thickness of the lower portion of the separation-membrane element 24 that abuts the lower spacer 28 is set as appropriate for the width of the raw-water flow paths 30. Although the width of the raw-water flow paths 30 is not restricted, the width is preferably set so that raw-water flows through the raw-water flow paths 30 at a flow rate of from 0.1 to 1.5 m/sec.

Desirably, at least a surface of the lower spacers 28, the surface abutting the adjacent separation-membrane elements, is made of a rubber material that has a durometer hardness (type A) of from 20 to 95, as determined according to ISO 7169-1 or a plastic material that has a Rockwell hardness (scale R) of from 50 to 130, as determined according to ISO 2039-1. More preferably, the upper spacers 28 are made of a material that has a durometer hardness (type A) of from 20 to 95.

Examples of the material that constitutes the lower spacers 28 and that has a durometer hardness (type A) of from 20 to 95, as determined according to ISO 7169-1, include, for example, various rubber materials such as urethane rubbers, nitrile rubbers, chloroprene rubbers, ethylene rubbers, butyl rubbers, fluoro-rubbers, silicon rubbers, and low modulus rubbers that have such durometer hardness (type A). Examples of the plastic material that has a Rockwell hardness (scale R) of from 50 to 130, as determined according to ISO 2039-1, include, for example, general-purpose plastics such as polyethylene terephthalates, polypropylenes, polyethylenes, and polycarbonates, and general-purpose engineering plastics such as nylons, polyacetals, ABS, polyvinylidene fluorides, and tetrafluoroethylene resins.

As illustrated in FIG. 10, the upper spacers 21 may be integrally fixed to a predetermined portion of the separation-membrane elements 24 to form a thick-walled portion. As illustrated in FIG. 11, the upper spacers 21 may be attached (as a separate structure) during assembly of the element block so that the separation-membrane elements 24 are sandwiched in the thickness direction between the spacers. In this case, any number of the upper spacers 21 may be disposed in each space depending on the thickness of the lower spacers. Desirably, a single upper spacer is disposed in each space between the elements to decrease the number of members.

With regard to the separation structure, the upper spacers 21 may be separately disposed between the separation-membrane elements, or the upper spacers 21 may be connected to each other and then be attached to the overall separation-membrane elements.

The upper spacers 21 have a plate shape or an annular shape. And any of plan view shapes can be selected, including, for example, a circular shape as illustrated in FIGS. 10 and 11, a rectangular shape, an elliptical shape, and a rhomboid shape. Regardless of their shape, the upper spacers 21 may include a through hole through which a shaft 20 is passed.

Desirably, at least a surfaces of the upper spacers 21, the surface abutting the adjacent separation-membrane elements, is made of a rubber material that has a durometer hardness (type A) of from 20 to 95, as determined according to ISO 7169-1. Examples of the material that constitutes the above surface include the rubber materials listed above for the lower spacers 28.

A separation-membrane module according to a third preferred embodiment includes an element block that is formed by arranging, in parallel, a plurality of pairs of separation-membranes with their respective permeate surfaces in opposition to each other and sealing edges of the pairs of the membranes; and an aeration block that includes an aeration pipe and that is disposed under the element block. In the element block, at least one upper spacer is disposed in the upper portion of each space between the adjacent separation-membrane elements, and a lower spacer is disposed under the upper spacer in each space between the adjacent separation-membrane elements. The upper spacer has a hardness that is lower than the hardness of the lower spacer. Preferably, in a separation-membrane module according to the third embodiment, the leftmost and the rightmost separation-membrane elements of the plurality of the separation-membrane elements that are arranged in parallel are secured to a frame at the respective lower spacers, and the separation-membrane elements are not secured to the separation frame at the respective upper spacers.

Figure 13:
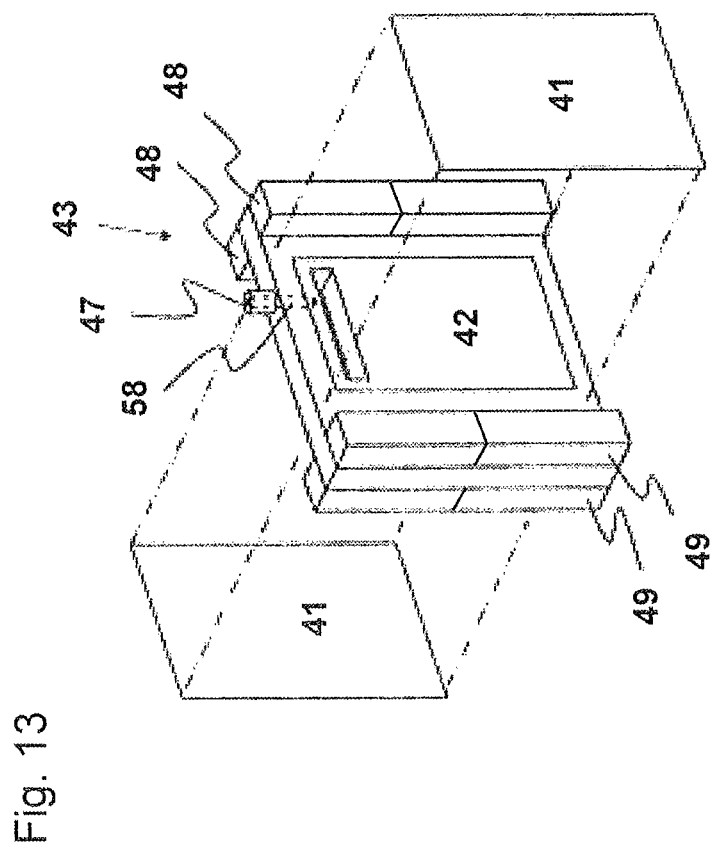
FIG. 13 is a perspective view schematically illustrating an element block that constitutes a separation-membrane module according to still another embodiment of the present invention.

Now, a separation-membrane module according to third embodiment will be described with reference to FIG. 13. In FIG. 13, upper spacers 48 have a thickness that is lower than the thickness of lower spacers 49. In particular, use of an elastic material for the upper spacers 48 that vibrate intensely allows prevention of the frictional wear between the upper spacers 48 and the separation-membrane elements. Use of a material that is harder than the material of the upper spacers 48 for the lower spacers 49 that vibrate less intensely allows maintenance of a constant spacing between the flow paths at the lower portion of the element block.

The separation-membrane element 43 according to the embodiment illustrated in FIG. 13 includes, at the front and back sides of a support plate 42, two separation-membrane sheets 41 that are arranged with their respective permeate surfaces in opposition to each other to form a pair of separation membranes. The edges of the pair of separation membranes are sealed by disposing the membranes in intimate contact with the support plate 42. A permeate outlet port 47 that is nozzle-shaped is disposed at the upper end of the support plate 42. The permeate outlet port 47 is connected via a communication hole 58 to a filtered-water flow space (hereinafter referred to as "filtered-water space") between the separation membrane 41 and the support plate 42. The separation-membrane element 43 is configured to receive water, which is then filtered into the filtered-water space, and to discharge the filtered-water through the permeate outlet port 47 via the communication hole 58. The separation-membrane element 43 includes the upper spacers 48 at the upper portion of the left and the right sides and the lower spacers 49 at the lower portion of the left and the right sides. As used herein, the left and the right sides of the separation-membrane element 43 refers to the horizontal ends of the separation-membrane element.

The support plate 42 is not restricted as long as the plate 42 is an approximately flat plate. The support plate 42 may be made of any material as long as the material has a rigidity as measured by a Young's modulus of about 300 MPa or more, as determined according to the ASTM D790 test method. Examples of the materials that can be selected and used as appropriate for the support plate 42 include metals such as stainless steels, resins such as acrylonitrile-butadiene-styrene rubbers (ABS resins) and vinyl chloride, composite materials such as fiber-reinforced resins (FRP), and other materials.

Figure 14:
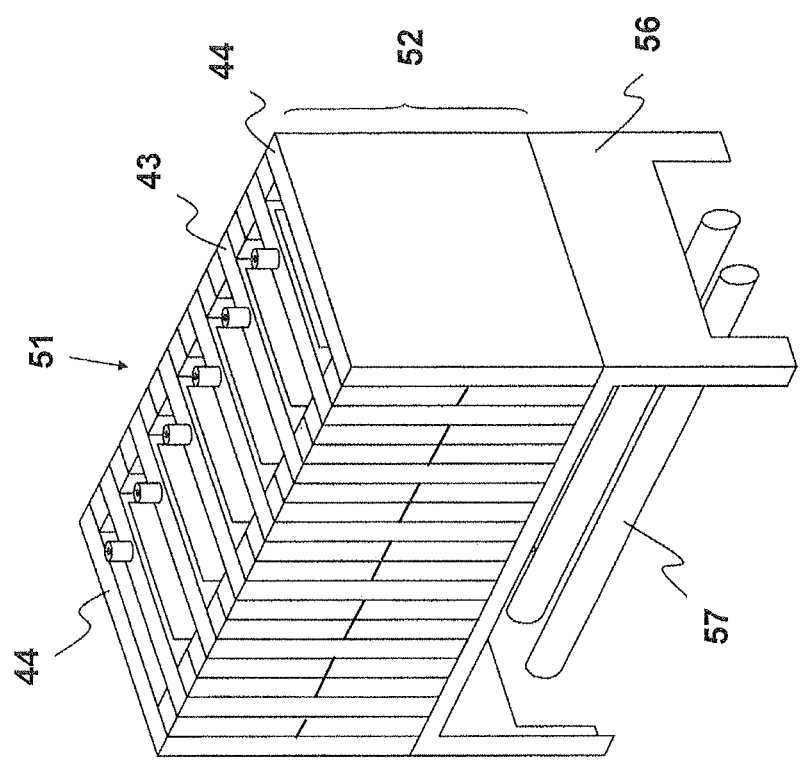
FIG. 14 is a perspective view schematically illustrating an element block that constitutes a separation-membrane module according to still another embodiment of the present invention.

As illustrated in FIG. 13, the upper spacers 48 and the lower spacers 49 may be integrated with the separation-membrane element by fixing the spacers to the both sides of the support plate 42 to form a thick-walled portion. Alternatively, as illustrated in FIG. 14, the upper spacers 48 and the lower spacers 49 may be attached (as a separate structure) during assembly of the element block so that the support plates 42 are sandwiched from the front and the back between the spacers. The separation-membrane elements illustrated in FIGS. 13 and 14 are an exemplary element that includes a support plate 42. However, separation-membrane elements that constitute a separation-membrane module according to the third embodiment are not limited to the elements illustrated in FIGS. 13 and 14, and pocket separation-membrane elements without a support plate can also be used.

A separation-membrane module 51 illustrated in FIG. 14 includes an element block 52 and an aeration block 56. The element block 52 is formed by arranging a plurality of separation-membrane elements 43 in parallel. The aeration block 53 that includes an aeration pipe 57 is disposed under the element block 52. The aeration pipe 57 of the aeration block 53 is connected to a blower (not shown). Air is blown from the underlying aeration block 56 toward the element block 52 of the separation-membrane module 51, the module being submerged in water-to-be-treated in a submerged membrane tank.

Figure 15:
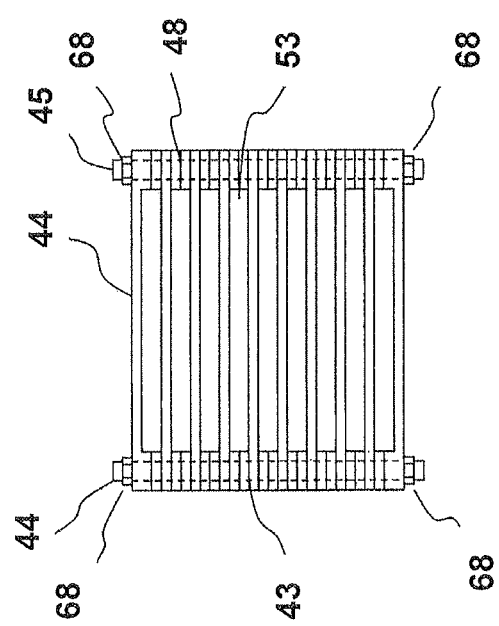
FIG. 15 is a plan view schematically illustrating an element block that constitutes a separation-membrane module according to still another embodiment of the present invention.

In FIG. 15, an element block 52 includes a plurality of separation-membrane elements 43 and sealing panels 44 that are attached to the foremost and the rearmost separation-membrane elements 43. And upper spacers 48 and lower spacers 49 include successive through-holes through which a through bolt 45 is passed through, as illustrated in FIG. 15. The both ends of the bolt can be locked by means of a nut 68. In adjacent separation-membrane elements 43 of the element block 52, raw-water flow paths 53 are formed in the spaces surrounded by the respective upper spacers 48, the respective lower spacers 49, and the respective separation membranes 41. Thus, the thickness of the upper spacers 48 and the thickness of the lower spacers 49 are set as appropriate for the width of the raw-water flow paths 53. Although the width of the raw-water flow paths 53 is not restricted, the width is preferably set so that raw-water flows through the raw-water flow paths 53 at a flow rate of from 0.1 to 1.5 m/sec.

Desirably, at least a surface of the upper spacers 48, the surface abutting the adjacent separation-membrane elements, is made of a material that has a durometer hardness (type A) of from 20 to 95, as determined according to ISO 7169-1, and at least a surface of the lower spacers 49, the surface abutting the adjacent separation-membrane elements, is made of a material that has a Rockwell hardness (scale R) of from 50 to 130, as determined according to ISO 2039-1.

The durometer hardness specified in ISO 7169-1 is frequently used typically for rubbers and elastomers, and is used for measuring the hardness of materials that are softer than the materials of which hardness is measured on the Rockwell hardness scale specified in ISO 2039-1, the scale being most commonly used for measuring the hardness of plastics. Two durometer hardness scales, type A and type D, are specified in ISO 7169-1. The type A is used for measuring the materials that is softer than the materials of which hardness is measured on the type D scale. If soft materials such as rubbers are measured on the Rockwell hardness scale R specified in ISO 2039-1, the materials exhibit a Rockwell hardness (scale R) of 50 or less, which means that the hardness cannot be adequately measured. Thus, the soft materials such as rubbers are measured typically on a durometer hardness scale specified in ISO 7169-1. Materials that have a durometer hardness (type A) of from 20 to 95 as determined according to ISO 7169-1, are softer than materials that have a Rockwell hardness (scale R) of from 50 to 130, as determined according to ISO 2039-1.

Examples of the material that constitutes the upper spacers 48 and that has a durometer hardness (type A) of from 20 to 95, as determined according to ISO 7169-1, include, for example, various rubber materials such as urethane rubbers, nitrile rubbers, chloroprene rubbers, ethylene rubbers, butyl rubbers, fluoro-rubbers, silicon rubbers, and low modulus rubbers that have such rubber hardness. Examples of the material that constitutes the lower spacers 49 and that has a Rockwell hardness (scale R) of from 50 to 130, as determined according to ISO 2039-1, include, for example, general-purpose plastics such as polyethylene terephthalates, polypropylenes, polyethylenes, and polycarbonates, and general-purpose engineering plastics such as nylons, polyacetals, ABS, polyvinylidene fluorides, and tetrafluoroethylene resins.

Finally, flat-sheet separation-membranes used in a separation-membrane element that constitutes a separation-membrane module according to an embodiment of the present invention will be described. For use as the flat-sheet separation-membranes, a membrane produced by forming a separation layer on a nonwoven-based substrate is preferred. For use for the separation layer, a cross-linked polymer is preferred in terms of the ability to control the pore diameter and durability. In terms of the ability to separate substances, it can be appropriate to use, for example, a separation layer that is formed by polycondensation of a polyfunctional amine with a polyfunctional acid halide on a porous support layer, and a membrane that is formed by laminating an organic-inorganic hybrid functional-layer. It is also possible to use a porous support layer such as a cellulose membrane, a polyvinylidene fluoride membrane, a polyethersulfone membrane, and a polysulfone membrane that has both of a separation function and a support function. In other words, a single layer may serve, as both of the separation layer and the porous support layer.

Preferably, a separation membrane according to the present invention includes a substrate and a separation layer. Especially, the separation membrane may include a separation layer that is made of a polyvinylidene fluoride resin. Preferably, the separation membrane includes, between the substrate and the separation layer, a layer that includes a resin that constitutes the separation layer and a material that constitutes the substrate. Penetration of a polyvinylidene fluoride blend resin through the surface of the substrate into the substrate allows the separation layer to adhere firmly to the substrate due to the so-called anchoring effect, which can prevent detachment of the separation layer from the substrate. The separation layer may be disposed only on one surface of the substrate or may be disposed on the both surfaces of the substrate. The separation layer may be symmetric or asymmetric with respect to the substrate. In a case in which the separation layer is disposed on the both surfaces of the substrate, the separation layers on the surfaces may be continuous via the substrate, or may be discontinuous.

In the separation membrane formed of the separation layer and the substrate, the substrate has the function of supporting the separation layer to impart strength to the separation membrane. Although the substrate may be constituted by any material, including, for example, organic substrates and inorganic substrates. The organic substrates are preferred in terms of light weight. Examples of the organic substrates include woven, knitted, and nonwoven fabrics made of organic fibers such as cellulose fibers, cellulose triacetate fibers, polyester fibers, polypropylene fibers, and polyethylene fibers. Among them, the nonwoven fabrics are preferred because their density is relatively easily controlled.

DESCRIPTION OF THE REFERENCE NUMERAL

1: separation-membrane module
2: element block
3: aeration block
4: separation-membrane element
5: suction tube
6: tube
7: collection pipe
8: upper spacer
9: lower spacer
10: shaft
11: fastener
12: housing frame
13: fastener
14: guide
15: receiver
16: collection path member
17: separation membrane
18: edge
19: resin member
20: shaft
21: upper spacer
22: element block
24: separation-membrane element
27: collection pipe
28: lower spacer
29: through hole
30: raw-water flow path
31: aeration pipe
41: separation membrane
42: support plate
43: separation-membrane element
44: sealing panel
45: through bolt
47: permeate outlet port
48: upper spacer
49: lower spacer
51: separation-membrane module
52: element block
53: raw-water flow path
56: aeration block
57: aeration pipe
58: communication hole
68: nut
70: multi-stacked module
71: PVC base plate
72: stainless pipe unit

The invention claimed is:

1. A separation-membrane module comprising an element block that is formed by arranging, in parallel, a plurality of separation-membrane elements that are formed by arranging a pair of separation-membranes with their respective permeate surfaces in opposition to each other and sealing the edges of the pair of the membranes; and an aeration block that comprises an aeration pipe and that is disposed under the element block, wherein in the element block, at least one upper spacer is disposed in the upper portion of each space between the adjacent separation-membrane elements, and a lower spacer is disposed under the upper spacer in each space between the adjacent separation-membrane elements, and wherein the leftmost and the rightmost separation-membrane elements of the plurality of the separation-membrane elements are secured to a frame only at the respective lower spacers, and wherein a space is formed between opposing permeate-surfaces of the separation membranes, and water collection path members are formed in the space as resin members bonded to both of the opposing permeate-surfaces of the pair of the separation membranes, and wherein each of the upper spacers, each of the lower spacers, and each of the separation-membrane elements have a through hole, wherein in the element block, the separation-membrane elements and the upper spacers are connected together by passing at least one first shaft through the through-holes of the upper spacers, and the separation-membrane elements and the lower spacers are connected together by passing at least one second shaft through the through-holes of the lower spacers.

2. The separation-membrane module according to claim 1, wherein the frame comprises a guide that limits horizontal movement of a portion of the leftmost and the rightmost separation-membrane elements of the plurality of the separation-membrane elements, the portion abutting the upper spacers.

3. The separation-membrane module according to claim 1, wherein the frame comprises a receiver that limits downward movement of a portion of the leftmost and the rightmost separation-membrane elements of the plurality of the separation-membrane elements, the portion abutting the upper spacers.

* * * * *